United States Patent [19]

Karpa

[11] Patent Number: 4,592,435

[45] Date of Patent: Jun. 3, 1986

[54] MONOLITHICALLY CAST CONCRETE WEIGHBRIDGE

[76] Inventor: Michael J. Karpa, 45 East Bend Ave., N., Hamilton, Ontario, Canada, L8L 7E1

[21] Appl. No.: 680,306

[22] Filed: Dec. 11, 1984

[51] Int. Cl.⁴ .................. G01G 19/02; G01G 21/22
[52] U.S. Cl. ............................. 177/132; 177/253; 52/223 R
[58] Field of Search ............ 177/132, 133, 134, 135, 177/253; 52/223 R, 223 L, 226, 230

[56] References Cited

U.S. PATENT DOCUMENTS

| | | | |
|---|---|---|---|
| 3,086,273 | 4/1963 | Welborn | 52/223 R |
| 3,195,277 | 7/1965 | Greulich | 52/223 R |
| 3,290,840 | 12/1966 | Middendorf | 52/223 R |
| 3,692,129 | 9/1972 | Pratt et al. | 177/134 X |
| 4,392,537 | 7/1983 | Lundborg | 177/134 |
| 4,466,501 | 8/1984 | Karpa | 177/134 |
| 4,529,051 | 7/1985 | Stolz et al. | 177/134 |

*Primary Examiner*—E. A. Goldberg
*Assistant Examiner*—Patrick W. Foster
*Attorney, Agent, or Firm*—Donald C. Studley

[57] ABSTRACT

A vehicle weighing device is described which is comprised of an elongated monolithic concrete slab containing a plurality of lateral supports. Each of the lateral supports is comprised of a pair of substantially vertically arranged end plates having their lower portions positioned contiguous to a plurality of crossbars which supply tension between the plates. Preferably the crossbars are connected to the plates. A zone of compressed concrete is positioned between the upper portions of the end plates. In a preferred embodiment of the invention the lateral supports may be considered to be a composite having a crossbar lower portion and a compressed concrete upper portion.

7 Claims, 6 Drawing Figures

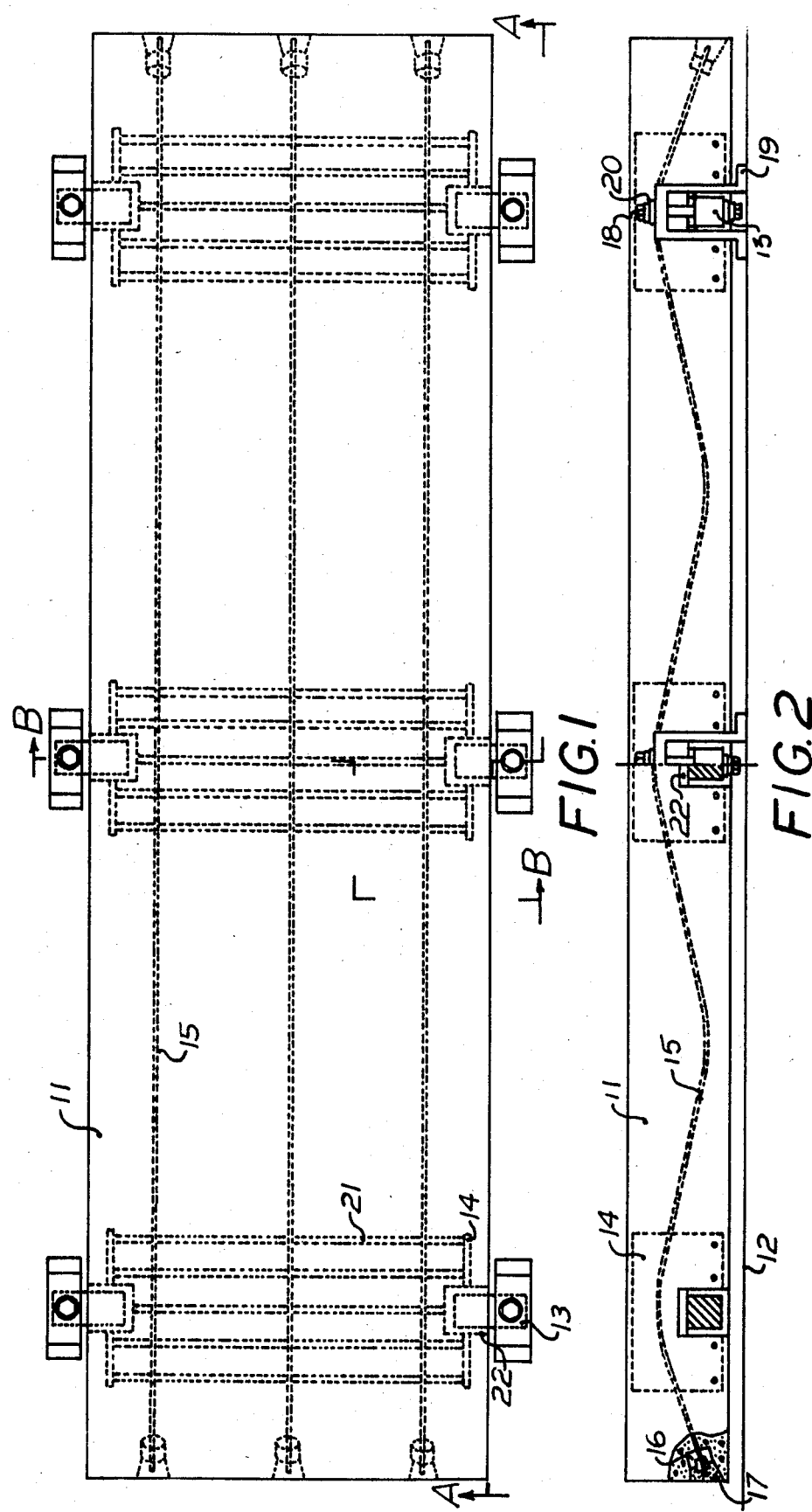

MONOLITHICALLY CAST CONCRETE WEIGHBRIDGE

BACKGROUND OF THE INVENTION

The present invention relates to the weighing of long, heavy vehicles such as highway trucks, and more particularly, to platform scales useful in determining the weight of such vehicles.

Long, concrete scales, or weighbridges have previously been built using a pad of prestressed concrete with steel underframe crossbeams at or near the 2 ends. Similarly weighbridges have been built utilizing a series of previously prestressed weighbridge pads, arranged end for end in a manner not unlike the building of a series of short scales arranged adjacent to each other, each almost having separate steel underframe crossbeams at or near its ends. Weighbridges have also been made by butting concrete panels against each other end to end and prestressing the entire assembly by post-tensioning cables running continuously through the assembly, suitably supporting steel crossbeams are positioned across the panels at the ends and at the intermediate butting hinge joints. In the prior art embodiments described, the steel crossbeams rest on load cells and in operation the load cell signals are summed thereby determining the weight on the structure. A major problem with such scale designs is the requirement of steel crossbeams at the support points. Steel is relatively expensive and requires protective maintenance on a regular basis to avoid corrosion. In addition, a further difficulty is that for a low profile construction any of the above proposals would require a large number of costly load cells.

A weighbridge according to the present invention minimizes the amount of exposed steel allowing the use of expensive protective coatings or even the substitutions of stainless steel without sacrificing economic competitiveness. Furthermore, the utilization of a long slab as a continuous beam facilitates the use of a reduced number of supports and, in turn, a substantial reduction in the number of costly load cells required. There are two factors in the design of the present device that permit the reduction of the number of supports, and load cells with a minimum slab thickness. These are: (1) a continuous structure which allows the use of a significant cantilever at each end of the weighbridge, thereby reducing the intermediate spans for a given weighbridge length and (2) a continuity of structure which inherently reduces the midspan moment for all intermediate spans by about 50% over what the moment would have been had the spans been simply supported. Typically prior art devices have spans that are simply supported.

SUMMARY OF THE INVENTION

The present vehicle weighing device comprises an elongated monolithic concrete slab which contains a plurality of lateral supports. Each of the lateral supports is comprised of a pair of substantially vertically arranged end plates having their lower portions positioned contiguous to a plurality of crossbars which supply tension between the plates. Preferably the crossbars are connected to the plates. The upper portions of the end plates have a zone of compressed concrete therebetween. In a preferred embodiment of the invention the lateral supports may be considered to be a composite having a crossbar lowr portion and a compressed concrete upper portion. In a less preferred embodiment steel beams may be utilized as lateral supports, or combinations of the lateral support embodiments may be utilized. The base slab of the present weighbridge has a plurality of stressing cables arranged at intervals within the slab. The cables are arranged to be near the top of the slab in area of negative moment and near the bottom of the slab in areas of positive moment. A plurality of load cells are operatively connected to the ends of the lateral supports. Means, such as those well known in the art, are utilized to sum, or total, the readings from each load cell to facilitate a determination of the weight on the slab.

In accord with the present invention a concrete slab of high strength concrete is poured in the shape of a simple parallelepiped, typical dimensions for a truck scale might be 10 ft. wide, 70 ft. long and 10 or 11 in. high. The slab may be formed by insitu pouring of concrete, using a hard surface ground area and a form of suitable planks (10 or 11 inch) outlining the desired slab perimeter.

In locating the lateral supports the supports at the ends of the slab are located to have a cantilever such that the maximum vehicle load a moment equal to the midspan positive moment produced by the same vehicle load. The magnitude of the negative moment at the intermediate supports typically is about equal to the magnitude of the end support and midspan moments. The support locations for a weighbridge of a given size may be calculated by known means by drawing an influence line, or diagram, for a specified rolling load with assumed support locations. The support locations are then relocated until the various moments become equal in magnitude yielding, in effect, a minimal slab thickness. The spaced longitudinal cables in the slab are positioned in a weaving, or undulating pattern, in the vertical plane, facilitating the development of a prestress in the concrete of opposite magnitude (opposite to the stress produced by loading moments) so that the stress produced by the applied loads are substantially cancelled.

To minimize the amount of exposed steel in the load cell support area the embodiment employing a composite beam is employed. In such embodiment, the necessary cross scale resisting moment is developed by the utilization of concrete covered steel crossbars in the lower portion of the slab for tension and a zone of concrete at the top portion of the slab for compression.

DETAILED DESCRIPTION AND PREFERRED EMBODIMENT OF THE INVENTION

Referring now to the drawings wherein like reference numbers indicate like parts in the various views:

FIG. 1 is a plan view of the monolith weighbridge slab having two end cantilevers and two intermediate spans.

FIG. 2 is a composite sectional view along line A—A of FIG. 1.

Figure 3:
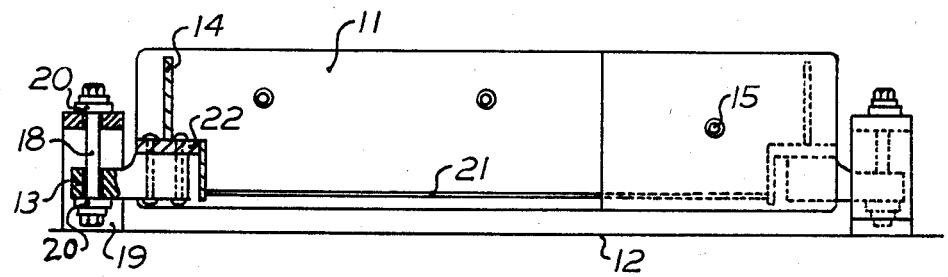
FIG. 3 is a composite sectional view along line B—B of FIG. 1.

Looking now at FIGS. 1 and 2, these figures show a monolithical concrete slab 11 which has been poured on site and is shown in its working position having been raised, suitably by jacking, a few inches above the ground 12 for clearance. Supporting slab 11 are six shear beam load cells 13 which are operatively connected, suitably by bolting, to steel weldment 22. Most of weldment 22 is imbedded in concrete to minimize the area exposed to corrosion. Passing through the concrete slab 11 are longitudinal stressing cables 15 which in a preferred embodiment are located in greased plastic tubes to permit post-tensioning after the concrete has set up. Cables 15 are anchored at each end by a wedge and casting assembly 16 as is well known in the practice of cable stressing. Typically, the access cavity is subsequently filled with mortar, such as, 17. The elevation, or height, of stressing cables 15 vary inside slab 11. The cables are positioned to provide a resisting moment in the slab which opposes the applied moment produced by the rolling loads, e.g. trucks, passing longitudinally over the slab. It should be noted that the cables are positioned near the top for negative moments (as at the support areas) and near the bottom for positive moments (as at midspan areas).

FIG. 3 shows in detail a preferred slab support arrangement. In this embodiment the ends of load cells 13 are supported by high strength bolts 18 which rest on ground mounted brackets 19. Each end of bolt 18 reacts through washers 20. Washers 20 are suitably spherical and enable the entire assembly to expand and contract with temperature changes or bridge deflection. Load cells 13 are suspended by bolts 18 introduce a lateral bending moment in the slab 11. In this embodiment such moment is counteracted by a composite lateral support which suitably is made up of steel cross bars 21 connected, suitably by welding, to the lower portion of steel end plates 14. End plates 14 have a zone of compressed concrete positioned between their upper portions which, in turn, reacts outward against the upper portions of the plate 14. Depending on the magnitude of the cross scale moment, for example, in the case of unrestricted positioning of vehicle wheels on the scale platform, end plates 14 may have to have considerable dimension in the longitudinal direction of the scale. That is, the lateral supports would require additional width. In such cases end plates 14 may take the form of a torque transmitting rectangular box section.

Figure 4:
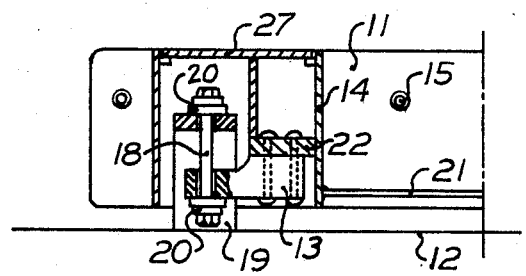
FIG. 4 shows an alternate lateral support arrangement.

FIG. 4 illustrates a variation of the support arrangement shown in FIG. 3 wherein the load assemblies are located within the perimeter of slab 11. In this embodiment the end plates on the lateral supports are in the form of box end plates 14. The operation of this arrangement is similar to that described above for the outboard system such as shown in FIG. 3. Suitably a cover plate 27 is provided to facilitate access from the top of slab 11 to the suspension system and load cells.

Figure 5:
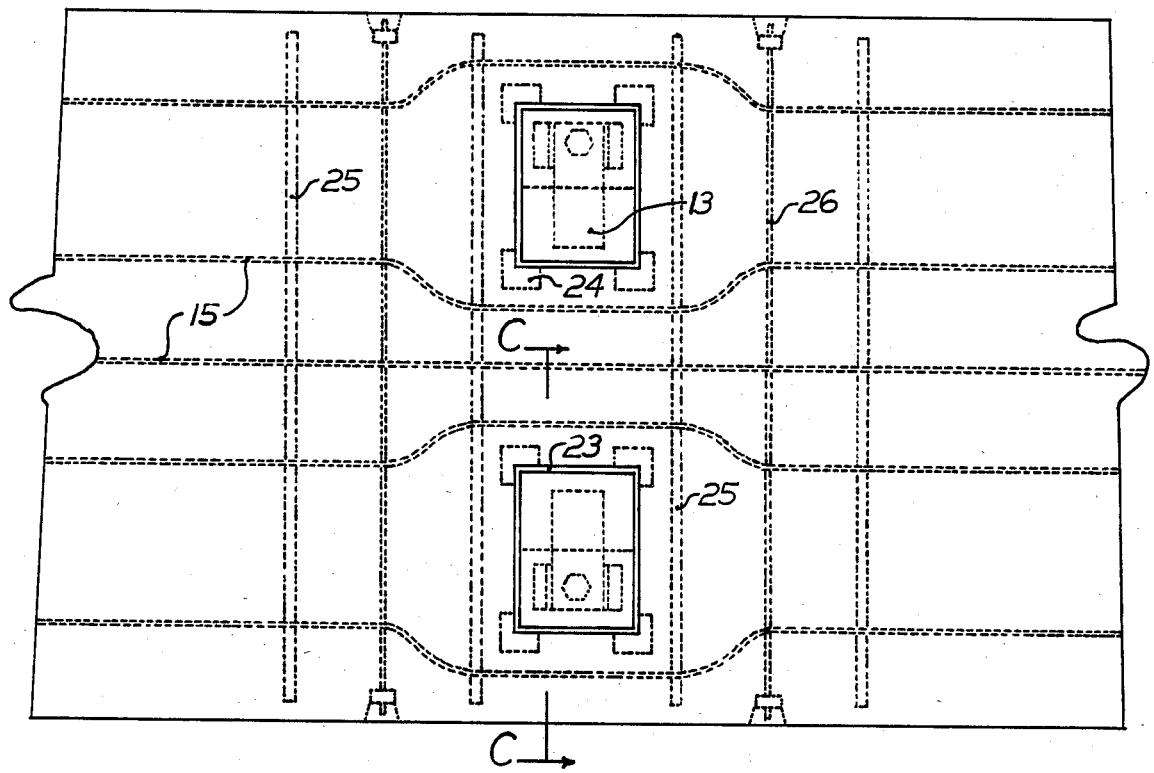
FIG. 5 shows a further alternative lateral support arrangement.
Figure 6:
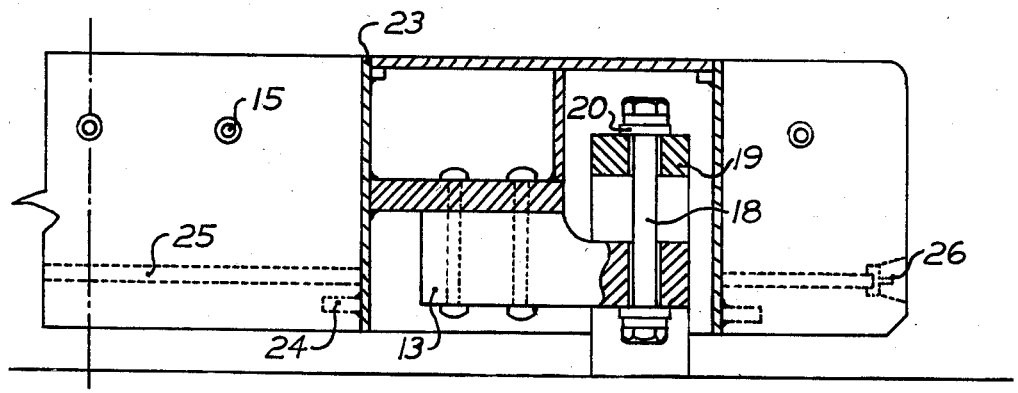
FIG. 6 is a section along line C—C of FIG. 5.

FIGS. 5 and 6 illustrate an additional embodiment of a support arrangement in which the load cells are positioned within the periphery of the slab and cross scale moment is reduced by positioning the foundation reaction points closer together. In this embodiment cross bars 24 are positioned contiguous to the bottom portions of box end plates 23 to provide tension in the zone therebetween. A zone of compressed concrete separates the top portions of said box end plates 23. In this embodiment load cells 13 are positioned in a box, an alternate embodiment of end plates 23. Support bolts 18, washers 20 and ground brackets 19 have the same functions as described above. Box 23 is suitably inserted into the form before the concrete is poured and develops the necessary vertical supporting force by shear lugs 24. The reduced cross beam moment is accommodated by reinforcing cross bars 25. Suitably lateral stressing cables 26 are also utilized and are especially useful in cases where very low profiles are required.

Although the invention has been described with reference to specific slab construction with some support variations, it will be appreciated that a number of further details can be altered without losing the basic features of the concept. For example, slab pre-stressing could be achieved in a stressing bed obviating the need for cable anchorage assemblies at each end. Although the suspension system is preferably a bolt type hanging arrangement, it will be understood that the load cells, may be arranged to react against hardened compression pins mounted directly on the foundation. A variety of different types of commercially available load cells and load cell application adaptors can be used. The load cells may be mounted on the foundation instead of on the weighbridge. Lateral concrete pre-stressing may be used to improve concrete durability, particularily in the lower support area, to enhance the performance of composite lateral supports. The lateral supports may be constructed entirely of steel beams substantially completely imbedded in the slab. While such arrangement would be inherently more expensive than composite beams, it would provide a ready parting joint and would allow the slab to be destressed, separated into smaller, re-assembleable pieces for ease of relocation of the scale. It will also be noted that a partition or separation joint, or a series of such partitions can be constructed across the concrete slab at various locations, such as inflection points, that is sections in the slab where the bending moment is zero. These separation joints may suitably be metal joints with shear elements or keyed concrete against concrete with suitable "gasketing" material for stress distribution as is presently done in highway bridge construction.

What is claimed is:

1. A vehicle weighing device comprising:
   (a) an elongated prestressed monolithic concrete slab containing a plurality of internal lateral supports,
   (b) each of said lateral supports comprised of a pair of substantially vertically arranged end plates having a plurality of crossbars positioned contiguous to the lower portion of said end plates supplying tension, the upper portions of said end plates having a zone of compressed concrete therebetween,
   (c) a plurality of stressing cables arranged longitudinally within the slab, said cables positioned near the top of said slab in areas of negative moment and near the bottom of said slab in areas of positive moment,
   (d) a plurality of load cells operatively connected to the ends of said lateral supports, and
   (e) means to sum the readings from each load cell to determine the weight on the slab.

2. The vehicle weighing device of claim 1 wherein said end plates are connected at their lower portions by said crossbars.

3. The weighing device of claim 1 wherein said lateral supports are steel beams.

4. The weighing device of claim 1 wherein said lateral supports do not extend beyond the dimensions of said slab.

5. The weighing device of claim 1 wherein said load cells are located within the periphery of said slab.

6. The weighing device of claim 1 wherein said end plates are in the form of a box.

7. The weighing device of claim 1 wherein lateral stressing cables are used in the support area.

* * * * *